United States Patent
Codrino

[11] 3,806,225
[45] Apr. 23, 1974

[54] TERMINAL FASTENER FOR LIGHT-GUIDE CABLES

[76] Inventor: Giuseppe Codrino, Via Stazione, Quattordio, Alessandria, Italy

[22] Filed: Nov. 28, 1972

[21] Appl. No.: 310,084

[52] U.S. Cl. .............................................. 350/96 B
[51] Int. Cl. .......................................... G02b 5/16
[58] Field of Search .................................. 350/96 B

[56] References Cited
UNITED STATES PATENTS

| | | | |
|---|---|---|---|
| 3,517,981 | 6/1970 | Rueger et al. | 350/96 B X |
| 3,649,098 | 3/1972 | Suverison | 350/96 B |
| 3,423,581 | 1/1969 | Baer | 350/96 B X |
| 3,510,641 | 5/1970 | Reynolds | 350/96 B X |
| 3,569,933 | 3/1971 | Longenecker et al. | 350/96 B X |
| 3,637,284 | 1/1972 | Plyler | 350/96 B |

Primary Examiner—David H. Rubin
Attorney, Agent, or Firm—Michael S. Striker

[57] ABSTRACT

An improved fastener for the introduction and fastening of light-guide cables, provided with a rivet, to their indicating lenses or bases fitted on motor cars, wherein there is included a socket portion provided with a hole for the introduction of the rivet, attached to the base or lens and a circular groove the length of which is equal to that of the rivet, and a longitudinally slotted tubular member for the introduction of the light-guide cable and provided on its front portion with a collar, which is also longitudinally slotted and with which there are integral two rods, extending longitudinally relative to the tubular member itself over a length being equal to the distance between the circular groove and the free end of the socket portion and having their ends folded at right angles so as to form hooks, fitting into the groove when the rivet is inserted into the hole of the socket portion.

5 Claims, 4 Drawing Figures

TERMINAL FASTENER FOR LIGHT-GUIDE CABLES

The present invention relates to an improved fastener for light-guide cables.

More specifically, this invention relates to an improved fastener, particularly suitable for fastening light-guide cables to the indicating lenses and bases mounted on motor cars.

As is well known, light-guide cables consist of a number of thin filaments of transparent material by which the optical radiation is "conveyed" from one point to the other, irrespective of the location of the latter relative to the former.

Said "light-guide" cables find wide applications in the motor car industry field: they are in fact currently used for the lighting of the indicating bases, fitted to the instrument board of motor cars.

The various fasteners tested heretofore in connection with the attachment of the light-guide cables to the screens or bases to be lighted have not been found, however, to be sufficiently practical and safe. Furthermore, they do not ensure an optimum utilization of the whole light beam being conveyed.

The fastener of the present invention provides instead a quick, practical and safe attachment of the light-guide cable to the base to be lighted, permitting at the same time to obtain a better lighting of the indicating bases, without bringing about appreciable dispersions of the light beam.

These and further advantages, which will become apparent from the following detailed description, are attained by the fastener of the present invention, consisting of a tubular member, showing a cylindrical configuration and provided with a longitudinal slot, into which there is fitted the end of the light-guide cable. Said tubular member shows a median collar, with which there are integral two rods, provided with hook-shaped ends and extending longitudinally relative to the tubular member itself.

The end of the light-guide cable to be fitted into the indicating base is provided with a rivet the expansion of which serves as a stopping means for the cable itself relative to the fastener and the base.

The latter is in turn formed with a blind hole, passing through its axis, and externally with a portion serving as an anchoring means for the two hook-shaped rods of the fastener.

The instant fastener is preferably made from plastic material, provided with a sufficient flexibility. These and further features of a functional and constructional nature of the fastener for fastening light-guide cables according to the present invention will be better understood from the following detailed description taken in conjunction with the figures given on the accompanying drawing, representing a non-limiting example of a preferred embodiment form, in which.

Figure 1:
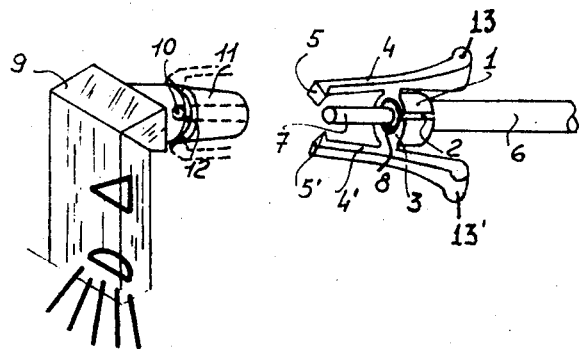
FIG. 1 shows in a perspective view an indicating base and the fastener with related light-guide cable fitted thereon.
Figure 2:
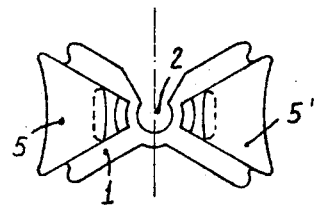
FIG. 2 shows the above-mentioned fastener in a front view.
Figure 3:
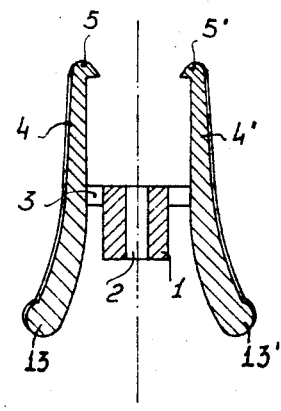
FIG. 3 shows the same fastener as above, but in a cross sectional view.
Figure 4:
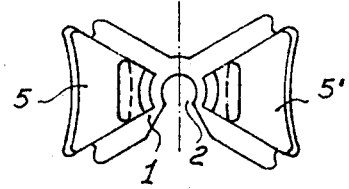
FIG. 4 shows the instant fastener in a rear view.

Referring now particularly to the numeral symbols appearing on the FIGS. 1-4 of the accompanying drawing, the fastener for light-guide cables according to the present invention is made up of a tubular member 1, in which there is formed a longitudinal slot 2.

The aforesaid tubular member 1 is provided on its front portion with a collar 3 having a slot of the same dimensions as slot 2.

Said collar 3 is fitted in turn with two rods or arms 4 and 4', extending along a suitable section beyond the body of the tubular member 1.

The aforementioned rods have their ends 5 and 5', respectively, folded at right angles so as to form projections which are something like a hook.

Into the tubular member 1 there is introduced via the slot 2 the light-guide cable 6.

Said cable is provided at its end with a rivet 7 the expansion portion 8 of which serves as a stopping means for the cable itself against the tubular member 1.

In the indicating base 9 represented in FIG. 1 by way of example, there is drilled a blind hole 10 of suitable diameter to permit the introduction therein of the rivet 7 on the light-guide cable.

At the aforementioned blind hole 10, the base 9 has a portion 11 which is provided with an outer circular groove 12 to which the hook-shaped ends 5 and 5' of the rods 4 and 4' may extend.

The length of the two rods 4 and 4' should be equal to the spacing between the groove 12 and the free end of the portion 11.

It is thus possible to fasten quickly and with the maximum stability the light-guide cable 6 to the respective indicating base 9 through the introduction of the rivet 7 into the hole 10 and fitting of the hook-shaped ends 5 and 5' into the groove 12.

The rods 4 and 4' are provided with extension pieces 13 and 13', which, when pressed, ensure the opening thereof. The instant fastener may be made from any plastic material whatever, provided it has a sufficient elasticity.

From the foregoing and a perusal of the various figures of the accompanying drawing, the functional character and practical application of the fastener according to the present invention will be clear.

Obviously, said fastener and related manufacturing and functional method have been described and represented by way of a non-limiting example and to demonstrate the practical embodiment of the general features of the present invention.

Various changes and modifications as to shape, dimensions and construction may be introduced in the practical embodiment of the fastener according to this invention, without departing from the scope of the invention.

What we claim is:

1. A light-transmitting system, particularly for monitoring the operational status of vehicle lamps, comprising a light-guiding cable having one end portion; a terminating member provided with an apertured socket which is formed with an outer circumferential groove inwardly of an end face of said socket; a fastener element having a tubular portion surrounding said end portion of said cable and provided with an axial slot and a pair of arms integral with said tubular portion at one axial end thereof, said arms each having one portion projecting forwardly of said axial end and provided with a projection which is received in said groove, and another portion projecting rearwardly of said axial end for engagement and manipulation by a user when said projection is to be withdrawn from said groove; and a hollow rivet on the outermost end portion of said cable having an expanded flange portion abutting said one axial end of said tubular portion and projecting forwardly from said axial end by a distance substantially equal to the distance between said groove and said end face and into said apertured socket.

2. A system as defined in claim 1, wherein said tubular portion is provided in the region of said one axial end with a collar, said arms being integral with said collar.

3. A system as defined in claim 1, wherein said other portions extend outwardly away from the periphery of said tubular portion and are adapted to be depressed inwardly toward said periphery for withdrawing said projections from said groove.

4. A system as defined in claim 1, wherein said fastener element is of synthetic plastic material.

5. A system as defined in claim 1, further comprising a display element; and wherein said terminating member is connected to said display element so that the latter displays the light transmitted by said cable.

* * * * *